Figure 1:
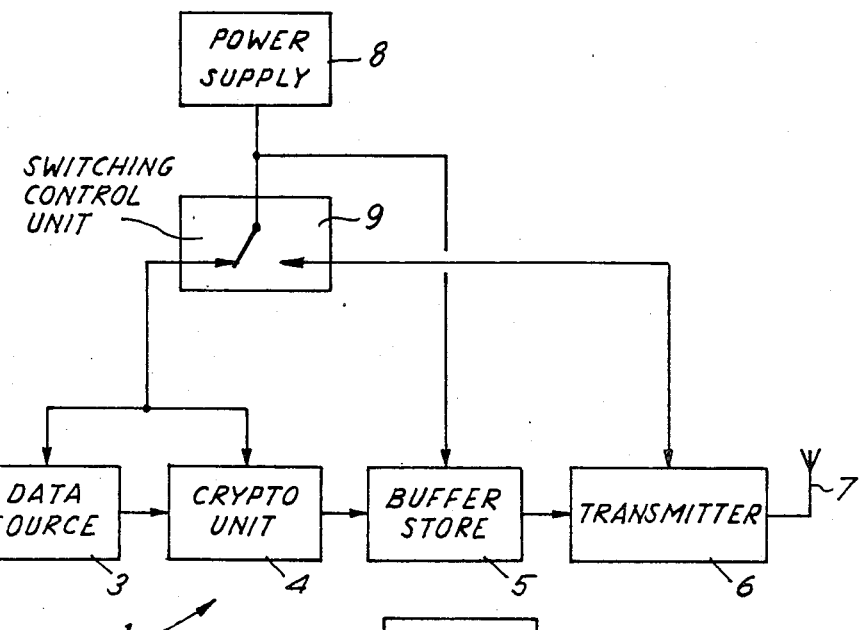
Figure 1:
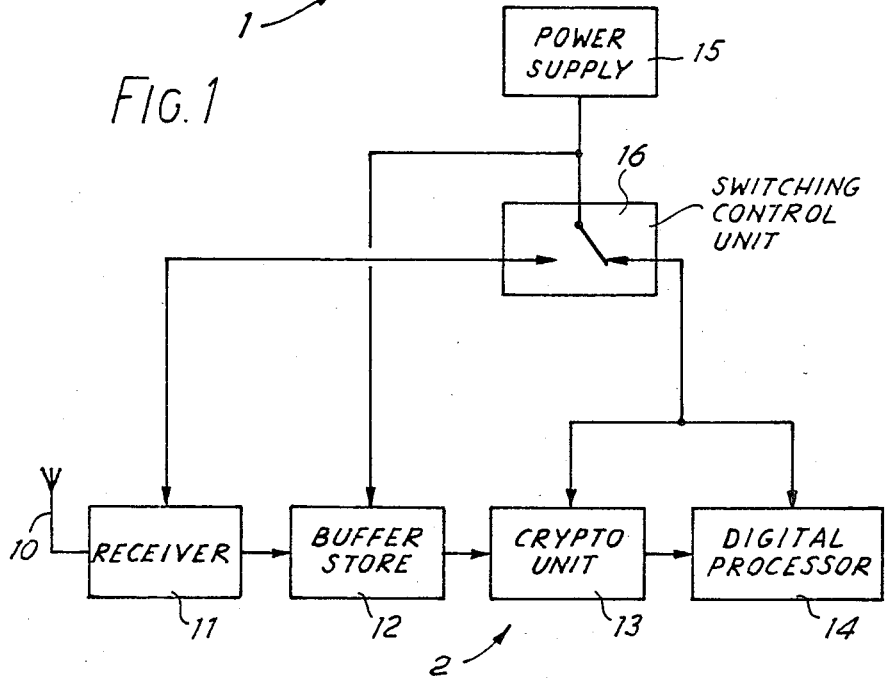

United States Patent [19]

Marzolini

[11] Patent Number: 4,811,392
[45] Date of Patent: Mar. 7, 1989

[54] COMMUNICATIONS NETWORK

[75] Inventor: Remo G. A. Marzolini, Middlesex, England

[73] Assignee: Thorn Emi Electronics Limited, Hayes, England

[21] Appl. No.: 942,992

[22] Filed: Dec. 18, 1986

[30] Foreign Application Priority Data

Dec. 18, 1985 [GB] United Kingdom ............... 8531209

[51] Int. Cl.⁴ ............................................. H04L 9/00
[52] U.S. Cl. .......................................... 380/9; 380/48; 380/49
[58] Field of Search ................. 380/9, 43, 44, 48, 49

[56] References Cited

U.S. PATENT DOCUMENTS

| | | | |
|---|---|---|---|
| 4,185,166 | 1/1980 | Kinch, Jr. et al. | 380/48 |
| 4,323,729 | 4/1982 | Westermayer | 380/48 |
| 4,399,323 | 8/1983 | Henry | 380/43 |
| 4,429,180 | 1/1984 | Unkenholz | 380/48 |
| 4,465,153 | 8/1984 | Van de pas et al. | 380/48 |

Primary Examiner—Salvatore Cangialosi
Attorney, Agent, or Firm—Fleit, Jacobson, Cohn & Price

[57] ABSTRACT

A transmitter station has a data source, a crypto unit, a buffer store for encrypted signals and a transmitter with an aerial, all with a common power supply. A switching control unit has a position in which it connects data source and crypto unit to the power supply but isolates transmitter therefrom, and another switch position in which transmitter is connected to the power supply while data source and crypto unit are isolated therefrom. In this way, if any signals output from data source pass directly (i.e. not via crypto unit) to the input of transmitter, they will not be sent on into the network because transmitter is "off" (i.e., de-energized) at that time.

8 Claims, 2 Drawing Sheets

COMMUNICATIONS NETWORK

The present invention relates to a communications network for the transfer of data in encrypted form.

One type of conventional communication system for encrypted digital data has a source of digital data (e.g. a digital processor or computer) which feeds plain text data to a cryptographic unit whose output, now encrypted, is applied to a transmitter for sending out to the remainder of the system. However, the transmitter input can also pick up some of the plain text data output from the source (whether by direct radiation or by transfer along the supply lines), and so this unencrypted signal is also sent out onto the system. Accordingly, it is possible for someone to obtain both encrypted and plain text signals and thereby derive the crypto key, whereupon the security of the system is breached. This can have further serious effects if this same crypto key is used in a number of installations or systems, especially as not all installations using a given crypto key may be vulnerable to this problem.

One known method of attempting to solve this problem is to minimise the incidence of radiation of the plain text data, by screening and/or by utilizing appropriate circuit design techniques. However effective screening may be expensive, cumbersome and inappropriate or inconvenient in many instances. Moreover the necessary circuit design techniques are contrary to those techniques required for nuclear hardening, and are often unsatisfactory or impractical in the applications relevant to these communications systems.

An object of the invention is to provide a communications network for encrypted signals which does not incorporate the aforementioned disadvantages.

The present invention provides a communications network having a plurality of stations, at least one station having: a source of signals, means to encrypt a signal from the signal source, means to transmit an encrypted signal into the network, the transmission means being inoperable when the encryption means is in use.

Accordingly the transmission means cannot send out an encrypted signal together with the plain text signal, because the transmission means is "off" whenever there is any possibility of an unencrypted signal reaching the input of the transmission means.

Likewise the present invention also provides a communications network having a plurality of stations, at least one station having: means to receive an encrypted signal from the network, means to decrypt a received signal, and means to process a decrypted signal, the reception means being inoperable when the decryption means is in use.

Thus also the reception means is "off" whenever any unencrypted signal is passing out of the decryption encrypted signal and an unencrypted signal.

Advantageously, the transmission means is operable only when the encrypted means is not in use; likewise, when appropriate, the reception means may be operable only when the decryption means is not in use.

Preferably, at least one station, in the communications network, has transmission means and reception means of the form indicated above, the transmission means being operable also only when the decryption means of the reception means is not in use; advantageously the transmission means and reception means are operable simultaneously. This arrangement is particularly suited to a fully duplex system.

Preferably a station in the communications network defined above has switch means to activate the transmission means (and/or, as appropriate, the reception means) only when the encryption means (and/or, as appropriate, the decryption means) is not in operation.

Preferably a station in the communications network defined above has signal storage means located intermediate the encryption means and the transmission means. Such an arrangement ensures that the output signal of the encryption means can be held for a while before being input to the transmission means, thereby enabling the operation of the encryption means to be separated temporally (with no overlap) from operation of the transmission means. The storage means may have a data-input rate equivalent (and synchronous) to the data-output rate; alternatively, the storage means may have a data-input rate differing from the data-output rate, this being particularly appropriate if error-coding is provided adjacent the encryption/decryption step.

The present invention is particularly suited to communications networks incorporating burst mode transmissions; it is also applicable to those incorporating continuous processing of data, if the data source provides the data in block form and the encrypted data is input to the transmission means at high speed.

The type of protocol used in a network embodying the present invention is dependent on the characteristics of the network. One protocol, which is particularly suited to a half-duplex system to present both stations transmitting at the same time, ensures that both stations are in a "standby receive" mode when their encryption means are not operational. One station commences transmission for a predetermined time, and thereafter the other responds with an acknowledgement; failure to receive the correct reply leads the first station to repeat the transmission, the repetition interval being larger than the time required for the storage means to off-load into the decryption means (this being the interval during which the reception means is inoperative). In another suitable protocol, one station transmits during even time divisions, and the other at odd time divisions according to the same routine.

In a fully duplex network, preferably different carrier frequencies are used for the two oppositely-directed paths, so that simultaneous transmission by the two stations can occur. A suitable protocol provides for the receivers always to be in a "receive" mode and the transmitters to be in a "standby" mode, except when the storage means are interacting with the encryption means or decryption means as appropriate; in this exempted instance, if one station intended transmitting data, it would use a "handshake" mode whereby it transmits a query signal and awaits an acknowledgement before passing on the data signal.

A network embodying the present invention can utilize any one of a number of protocols for establishing the completion of a burst transmission. In one protocol, all bursts are of an equal duration, and the receiving station is aware of the number of bits contained in the message (i.e. all those bits following the sync pattern). In another protocol, the messages are of varying lengths and the end of the message is identified by a distinctive pattern. In either case, the carrier signal ceases at the end of a burst, so that the lack of a carrier is an indication that the burst has been completed.

The present invention also embodies a station for use in a communications network as defined herein.

Figure 2:
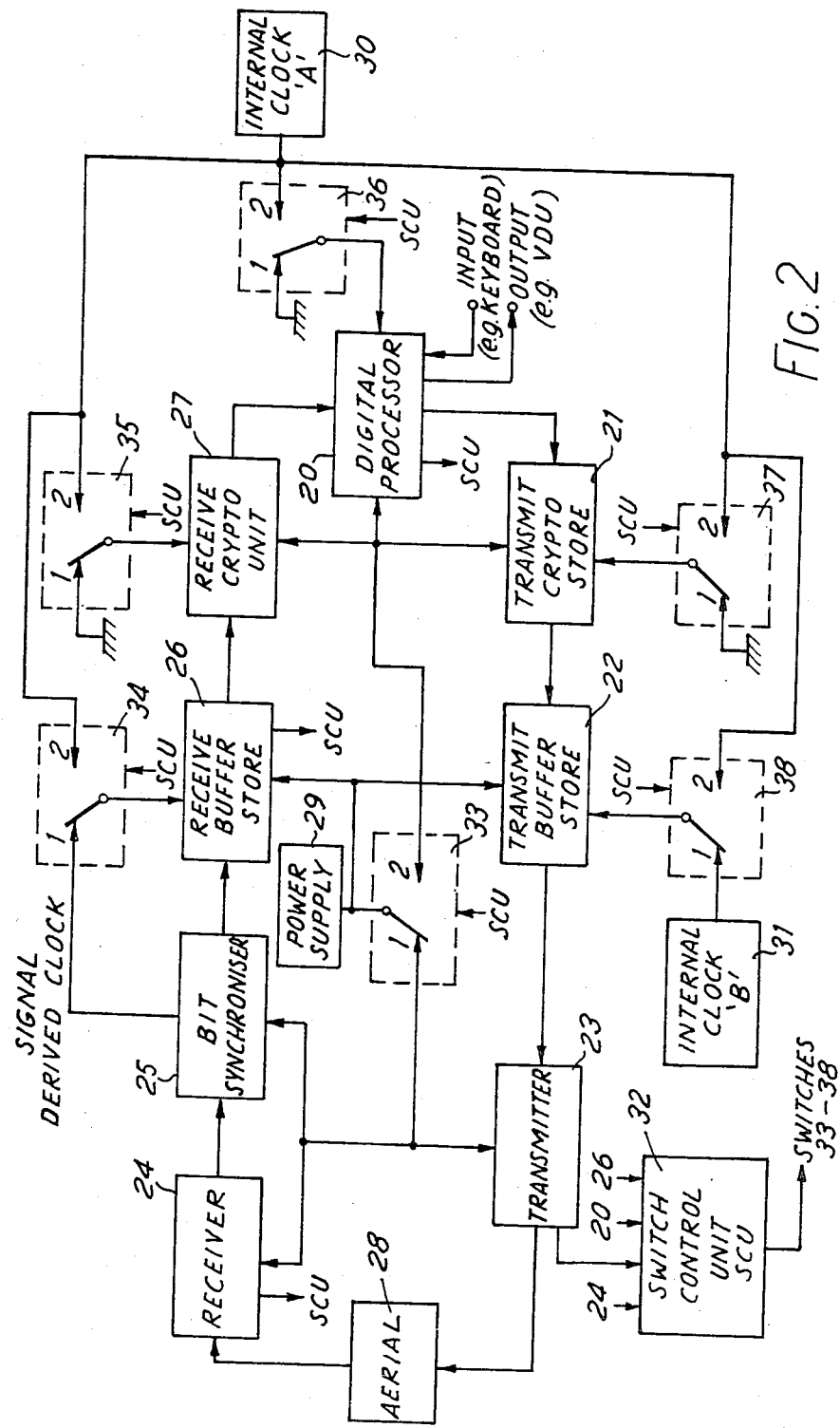

In order that the invention may more readily be understood, a description is now given, by way of example only, reference being made to the accompanying drawings, in which:

FIG. 1 is a schematic diagram of part of a communications network embodying the present invention; and FIG. 2 is a schematic diagram of part of another communications network embodying the present invention.

The simplex communications network partly shown in FIG. 1 has a number of transmitter stations (only one, referenced 1, is illustrated) and a number of receiver stations (only one, referenced 2, is illustrated).

Transmitter station 1 has a data source (for example a digital processor or computer), a crypto unit 4 for converting input signals into encrypted format, a buffer store 5 for holding encrypted signals and a transmitter 6 with an aerial 7 to send out to the network signals from store 5, all these components sharing a common power supply 8. The station also has a switching control unit 9 which is arranged so that it has two separate switch positions, in one of which it connects data source 3 and crypto unit 4 to the power supply 8 but isolates transmitter 6 therefrom; in the other switch position, transmitter 6 is connected to the power supply 8 while data source 3 and crypto unit 4 are isolated therefrom. In this way, if any signals output from data source 3 pass directly (i.e. not via crypto unit 4) to the input of transmitter 6, they will not be sent on into the network because transmitter 6 is "off" (i.e. de-energised) at that time. Also, when the transmitter 6 is energised (and thereby itself capable of sending out to the network any unencrypted signals which might appear at its input) data source 3 is de-energised and therefore cannot produce any unencrypted signals which might pass directly to the input of transmitter 6. Store 5 is connected directly to the power supply 8 at all times, and remains unaffected by operation of the switching control unit 9.

The station 1 operates in the following manner when a data signal is to be sent out on the network. Switching control unit 9 takes up the position illustrated in FIG. 1 whereby data source 3 and crypto unit 4 are simultaneously energised, so that the appropriate data signal is output from source 3, is encrypted by unit 4 and then passes to store 5. Once the entire signal in encrypted form is held in store 5, switching control unit 9 reverts to its other position thereby de-activating source 3 and unit 4 while activating transmitter 6 which then receives the encrypted signal from store 5. Once the signal has been fully transmitted, the cycle can be repeated if appropriate.

In a modification to the above method of operation, the unit 9 is in each of its positions for predetermined intervals of time (whether equal or not), irrespective of the duration of the message signal to be conveyed.

In another modification, all the components are continually energised, and unit 9 is modified such as to selectively instruct operation of the components for example by issuing enabling/disabling signals.

Receiver station 2 has a number of components which operate together in an analogous way to those of transmitter station 1; these components include an aerial 10, a receiver 11, a buffer store 12, a crypto unit 13 to decrypt signals output from store 12, a digital processor 14, a power supply 15 common to station 2 and a switching control unit 16. Accordingly when receiving a data signal, initially the receiver 11 and store 12 are energised so that the signal passes to store 12. Once all the signal is in the store 12, the unit 16 acts to de-energise receiver 11 while energising crypto unit 13 and digital processor 14, so that the signal in store 12 can be duly decrypted and passed to processor 14 for appropriate action.

FIG. 2 shows a station for use in a fully-duplex communications network of the present invention. The station has a digital processor 20 which acts as a source of data signals for those to be sent out onto the network from the station, and as a destination for signals sent into the station. The "transitting channel" of the station has a transmit crypto unit 21, a buffer store 22 and a transmitter 23; the "receiving channel" has a receiver 24, a bit synchroniser 25, a receive buffer store 26 and a receive crypto unit 27. These two channels share a number of facilities including aerial 28, power supply 29, the internal clocks 30 and 31, the switch control unit 32 and switches 33 to 38.

This station essentially operates in the same manner as the network of FIG. 1, with the additional requirement that, although simultaneous tranmission and reception is possible, there is neither tranmission nor reception while any crypto unit in the station is in use. Thus the receiver buffer store 26 cannot read into receive crypto unit 27 while the transmit buffer store 22 is read out, so as to avoid receiver-channel plain text leakage into the transmitter channel. The protocol ensures that, while transmit buffer store 22 reads out into transmitter 23, the receiver 24 reads into the receive buffer store 26; thereafter, both channels are switched over into the "crypto" mode and the data is decoded.

When all switches 33 to 38 are in position 1, the station is in the mode allowing reception and/or tranmission of signals. In this condition the bit synchroniser provides the received signal clock for the buffer store, and internal clock 31 provides the transmit clock for reading the buffer store 22 out into transmitter 23. When all switches 33 to 38 are in position 2, the station is in the mode allowing encryption and/or decryption of the data signals. In this condition internal clock 30 provides the timing for the receive buffer store 26 and receive crypto unit 27, and the transmit buffer store 22 and transmit crypto unit 21.

In a modification, the station has error correction to overcome the effect of chance errors on the crypto units, and appropriate devices can be provided on either side of one or both stores.

In another modification to either of the above-illustrated arrangements, one or more optical isolators may be used to provide or enhance the selective operation of the crypto unit(s) and the transmitter(s)/receiver(s). Thus for example such optical isolators may be located between the digital processor and the crypto unit(s), or between the crypto unit(s) and the buffer store(s), or between the store(s) and the receiver/transmitter. If any of these cases, the isolators are switched into operation (either by powering on/off or by enabling/disabling) such as to according with the operation of the crypto unit(s) and the transmitter(s)/receiver(s) mentioned in relation to the illustrated examples.

I claim:

1. A communications network having a plurality of stations, at least one station having: a source of signals, means to encrypt the signals from the signal source, means to transmit encrypted signals from the encryption means into the network, and means to provide that the transmission means is inoperable during all the time that the encryption means is in use.

2. A communications network according to claim 1, wherein at least one station has means to receive encrypted signals from the network, means to decrypt received signals, and means to process decrypted signals from the decryption means, and means to provide that the reception means is inoperable during all the time that the decryption means is in use.

3. A network according to claim 1, wherein at least one station has transmission means and reception means, and means to provide that the transmission means is inoperable also during all the time that the decryption means of the reception means is in use.

4. A network according to claim 1, wherein the transmission means and reception means are operable simultaneously.

5. A network according to claim 1, comprising switch means to activate the transmission means, or reception means, only when the encryption means, or decryption means, is not in operation.

6. A network according to claim 1, comprising signal storage means located intermediate the encryption means and the tranmission means, or intermediate the reception means and the decryption means, as appropriate.

7. A station for a communications network, the station having a source of signals, means to encrypt a signal from the signal source, means to transmit an encrypted signal into a communications network, the transmission means being inoperable during all the time that the encryption means is in use.

8. A station according to claim 7, the station having means to receive an encrypted signal from a communications network, means to decrypt a received signal, and means to process a decrypted signal, the reception means being inoperable during all the time that the decryption means is in use.

* * * * *